United States Patent [19]
Shimizu et al.

[11] Patent Number: 5,997,774
[45] Date of Patent: Dec. 7, 1999

[54] PASTE FOR FORMING INTERNAL ELECTRODE IN A CERAMIC ELEMENT

[75] Inventors: Yasushi Shimizu, Takefu; Minoru Yonezawa, Omihachiman, both of Japan

[73] Assignee: Murata Manufacturing Co., Ltd., Japan

[21] Appl. No.: 09/249,957

[22] Filed: Feb. 12, 1999

[30] Foreign Application Priority Data

Feb. 13, 1998 [JP] Japan ................................ 10-031390

[51] Int. Cl.$^6$ ................................ H01B 1/20; H01B 1/22
[52] U.S. Cl. ................................ 252/514; 252/519.21
[58] Field of Search ................................ 252/514, 519.21

[56] References Cited

U.S. PATENT DOCUMENTS

| | | | |
|---|---|---|---|
| 4,599,277 | 7/1986 | Brownlow et al. | 428/552 |
| 5,814,248 | 9/1998 | Tani et al. | 252/512 |

FOREIGN PATENT DOCUMENTS

| | | |
|---|---|---|
| 4425815 | 8/1995 | Germany . |
| 6-215980 | 5/1994 | Japan . |

*Primary Examiner*—Mark Kopec
*Attorney, Agent, or Firm*—Ostrolenk, Faber, Gerb & Soffen, LLP

[57] ABSTRACT

The present invention provides a paste for forming an internal electrode in a ceramic element. The paste causes no sudden heat generation from an organic vehicle contained therein during a degreasing step and allows Pd or Ag/Pd serving as an internal electrode to expand freely as a result of oxidation during a firing step, to thereby prevent structural defects of the ceramics such as delamination, when used for the formation of internal electrodes in a ceramic element such as a laminated ceramic capacitor. The paste contains a metal powder of Pd or Ag/Pd, Pd resinate, Cr resinate and an organic vehicle. Preferably, the Pd resinate contains sulfur in the molecule. Also preferably, the paste contains the Pd resinate in an amount of about 2.0–3.0 parts by weight as Pd, based on 100 parts by weight of Pd in the metal powder, and the Cr resinate in an amount of about 0.03–0.12 parts by weight as $Cr_2O_3$, based on 100 parts by weight of the metal powder.

15 Claims, No Drawings

PASTE FOR FORMING INTERNAL ELECTRODE IN A CERAMIC ELEMENT

BACKGROUND OF THE INVENTION

1. Field of the Invention

The present invention relates to a paste for forming an internal electrode in a ceramic element such as a laminated ceramic capacitor.

2. Description of the Related Art

Among ceramic elements, laminated ceramic capacitors are generally produced by the following steps: application, through screen printing, of a paste containing Pd or Ag/Pd as a primary component for forming an internal electrode onto a ceramic green sheet formed of a ceramic dielectric material comprising barium titanate, etc. as a primary component and having a thickness of 10–30 μm; laminating a predetermined number of the printed sheets; pressing; cutting; and firing at about 900–1400° C. in air.

Ceramic green sheets that are used in the above process are produced by mixing ceramic powder and an organic binder to provide a powder-dispersed slurry, molding the slurry into a sheet by the doctor blade method, and drying to an appropriate level of dryness.

Pastes for forming an internal electrode that are used in the above process are produced by incorporating Pd powder, Ag-Pd alloy powder, or a powder mixture of Ag and Pd into an organic vehicle by way of mixing to thereby achieve dispersal.

In general, firing for the production of the above-described laminated ceramic capacitors comprises two steps, i.e., a degreasing step wherein the binder contained in the ceramic green sheets and a binder component contained in the paste for forming an internal electrode are combusted for decomposition, and a firing step wherein the ceramic powder and the metal powders are sintered.

In the degreasing step, the binder component in the paste suddenly generates heat at relatively low temperature (about 200° C.) due to a catalytic effect of the metal powder serving as a material for an internal electrode. Therefore, the step involves a problem that structural defects such as cracks and delamination occur in a dielectric layer of the laminated ceramic capacitors.

In the firing step, the Pd or an Ag/Pd component in the internal electrode is oxidized during firing in air, particularly at about 300° C.–800° C., to thereby expand. This step involves a problem that the oxidation-induced expansion generates internal stress in the ceramics to easily cause structural defects such as delamination.

SUMMARY OF THE INVENTION

In view of the foregoing, an object of the present invention is to provide a paste for forming an internal electrode in a ceramic element, the paste being endowed with the following characteristics: when used for forming an internal electrode in, for example, a laminated ceramic capacitor, the paste does not permit a binder element thereof to cause sudden heat generation during the degreasing step and enables prevention of structural defects of ceramics such as delamination, by allowing oxidation-induced expansion of Pd and Ag/Pd in the internal electrode during firing.

In order to attain the above object, in one aspect of the present invention, there is provided a paste for forming an internal electrode in a ceramic element which comprises a metal powder of Pd or Ag/Pd, Pd resinate, Cr resinate and an organic vehicle.

Preferably, the Ag/Pd is at least one member selected from the group consisting of a powder of Ag-Pd alloy, a co-precipitate powder of Ag and Pd and a powder mixture comprising Ag and Pd.

Preferably, the Pd resinate contains sulfur (S) in the molecule.

Preferably, the paste of the present invention contains the Pd resinate in an amount of about 2.0–3.0 parts by weight calculated as Pd, based on 100 parts by weight of Pd in the metal powder, and the Cr resinate in an amount of about 0.03–0.12 parts by weight calculated as $Cr_2O_3$, based on 100 parts by weight of the metal powder.

When the paste in which Pd resinate is incorporated is used for forming an internal electrode in a ceramic element, there can be obtained an electrode of a low film density, i.e., an electrode having voids therein which can tolerate oxidation-induced expansion of the Pd serving as an internal electrode during the step of firing ceramics.

In addition to Pd resinate, resinates of a noble metal such as Au or Pt may also be used. However, since such resinates of metal such as Au or Pt have high metal content by weight, they must be added in a large amount in order to reduce the film density of the paste. Furthermore, Au and Pt are particularly expensive among noble metals, and therefore use thereof is inevitably restricted. In the meantime, base metal resinates, which are also available as metal resinates, are not suited for use singly in that they tend to inhibit sintering of Pd and Pd/Ag serving as materials for an electrode, resulting in that the produced electrode is apt to have deteriorated characteristics.

Addition of Cr resinate along with Pd resinate prevents sudden grain growth of powdery metal such as Pd or Ag induced by addition of Pd resinate.

Furthermore, when a compound containing sulfur is added in the ceramic degreasing step, it is possible to prevent sudden heat generation by the binder component, which is otherwise induced by a catalytic effect of the metal powder. Therefore, Pd resinate containing sulfur in the backbone is useful in the prevention of sudden heat generation of the binder component in the paste.

Thus, addition of Pd resinate and Cr resinate to the paste for forming an electrode enables prevention of structural defects of ceramics such as delamination due to oxidation-induced expansion of Pd or sudden heat generation from a binder component.

The amounts of Pd resinate and Cr resinate which are added to the paste preferably fall within the ranges described below.

Pd resinate is incorporated preferably in an amount of about 2.0–3.0 parts by weight calculated as Pd, based on 100 parts by weight of Pd powder. When the amount is less than about 2 parts by weight, reduction in film density of the paste is insufficient to hamper oxidation-induced expansion of Pd and to easily generate structural defects, whereas when the amount is in excess of about 3 parts by weight, the film density decreases drastically to thereby easily cause structural defects.

Cr resinate is incorporated preferably in an amount of about 0.03–0.12 parts by weight calculated as $Cr_2O_3$, based on 100 parts by weight of the metal powder. When the amount is less than about 0.03 parts by weight, prevention of grain growth of the metal powder due to addition of Pd resinate is insufficient to easily permit delamination, whereas when the amount is in excess of about 0.12 parts by weight, adhesion between the paste film and a ceramic sheet is deteriorated to easily cause delamination of an electrode portion and a ceramic portion in a laminated ceramic capacitor after firing.

Embodiments of the paste for forming an internal electrode in a ceramic element according to the present invention will next be described by way of example.

DESCRIPTION OF PREFERRED EMBODIMENTS

Example 1

The following starting materials for a paste were provided: spherical Pd powder having an average grain size of 0.7 μm; Pd resinate formed of palladium balsam ($C_{10}H_{18}SPdCl_{1-3}$) having a metallic Pd content of 10 wt %; Cr resinate formed of chromium naphthenate having a Cr content calculated as $Cr_2O_3$ of 6 wt %; and an organic vehicle formed of 8 wt % ethyl cellulose solution. Terpineol was used as a solvent.

These materials were weighed and portioned in proportions shown in Table 1, and these portions were kneaded by use of a three-roll mill, to thereby obtain pastes. Sample No. with an asterisk (*) means comparative sample which is outside the present invention.

TABLE 1

| Sample No. | Pd Powder (wt. %) | Organic vehicle (wt. %) | Pd resinate (wt. %) (Note 1) | Cr resinate (wt. %) (Note 2) | Solvent (wt. %) |
| --- | --- | --- | --- | --- | --- |
| 1* | 50 | 30 | 0 | 0 | 20.0 |
| 2* | 50 | 30 | 10.0(2.0) | 0 | 10.0 |
| 3* | 50 | 30 | 15.0(3.0) | 0 | 5.0 |
| 4* | 50 | 30 | 0 | 0.25(0.03) | 19.8 |
| 5* | 50 | 30 | 0 | 1.00(0.12) | 19.0 |
| 6 | 50 | 30 | 10.0(2.0) | 0.25(0.03) | 9.8 |
| 7 | 50 | 30 | 15.0(3.0) | 0.25(0.03) | 4.8 |
| 8 | 50 | 30 | 10.0(2.0) | 1.00(0.12) | 9.0 |
| 9 | 50 | 30 | 15.0(3.0) | 1.00(0.12) | 4.0 |
| 10 | 50 | 30 | 12.5(2.5) | 0.58(0.07) | 6.9 |
| 11 | 50 | 30 | 12.5(2.5) | 1.25(0.15) | 6.3 |
| 12 | 50 | 30 | 17.5(3.5) | 1.00(0.12) | 1.5 |

Note 1: Numerical figures in parentheses indicate amounts of added Pd resinate in parts by weight as metallic Pd, based on 100 parts by weight of Pd powder.
Note 2: Numerical figures in parentheses indicate amounts of added Cr resinate in parts by weight as $Cr_2O_3$, based on 100 parts by weight of Pd powder.

Each paste shown in Table 1 was applied through screen printing onto a ceramic green sheet formed of dielectric powder comprising barium titanate as a primary component and an organic binder and having a thickness of 20 μm, so as to obtain a coating film having a thickness of 2 μm, and the film was brought to dryness. The dry film was subjected to density measurement. A plurality of the obtained films were laminated and pressed so as to form a laminate having 11 layers of internal electrodes which was cut and fired at 1300° C. in air to thereby obtain a sintered laminated ceramic capacitor.

The sintered capacitor was cut in a direction normal to an internal electrode plane, and the cross-section was observed to check for structural defects such as delamination or cracks.

The densities of the dry films obtained from the pastes and occurrence of structural defects are shown in Table 2.

TABLE 2

| Sample No. | Film density of dry film obtained from the paste (g/cm³) | Occurrence of structural defects (%) |
| --- | --- | --- |
| 1* | 8.5 | 100 |
| 2* | 6.5 | 90 |
| 3* | 6.0 | 41 |
| 4* | 7.9 | 100 |
| 5* | 6.4 | 90 |
| 6 | 5.8 | 0 |
| 7 | 5.3 | 0 |
| 8 | 5.7 | 0 |
| 9 | 5.2 | 0 |
| 10 | 5.5 | 0 |
| 11 | 5.4 | 1.2 |
| 12 | 5.0 | 2.2 |

As is clear from the results from sample Nos. 6 through 12 in Tables 1 and 2, incorporation of Pd resinate and Cr resinate into the Pd pastes reduced the density of the dried films obtained from the pastes to thereby successfully allow oxidation-induced expansion of Pd and prevent anomalous growth of metal powder. Thus, structural defects such as delamination can be prevented.

Sudden heat generation from a binder component at low temperature in the degreasing step can be prevented by use of a resinate containing sulfur in the molecule serving as Pd resinate. This also prevents generation of structural defects.

In contrast, pastes containing no Pd resinate and/or Cr resinate cannot prevent generation of structural defects, as proven by sample Nos. 1 through 5.

As demonstrated by sample Nos. 6 through 10, Pd resinate is incorporated more preferably in an amount of about 2.0–3.0 parts by weight calculated as Pd, based on 100 parts by weight of Pd (powder), in that structural defects are more effectively prevented. Also, Cr resinate is incorporated more preferably in an amount of about 0.03–0.12 parts by weight calculated as $Cr_2O_3$, based on 100 parts by weight of the metal powder, in that structural defects are more effectively prevented.

Example 2

The following starting materials for a paste were provided: spherical Ag/Pd (Ag/Pd=3/7 weight ratio) co-precipitation powder having an average grain size of 0.7 μm; Pd resinate formed of palladium balsam ($C_{10}H_{18}SPdCl_{1-3}$) having a metallic Pd content of 10%; Cr resinate formed of chromium naphthenate having a Cr content calculated as $Cr_2O_3$ of 6%; and an organic vehicle formed of 8% ethyl cellulose solution. Terpineol was used as a solvent.

These materials were weighed and portioned in proportions shown in Table 3, and these portions were kneaded by use of a three-roll mill, to thereby obtain pastes.

TABLE 3

| Sample No. | Ag/Pd powder (wt. %) | Organic vehicle (wt. %) | Pd resinate (wt. %) (Note 1) | Cr resinate (wt. %) (Note 2) | Solvent (wt. %) |
| --- | --- | --- | --- | --- | --- |
| 13 | 50 | 30 | 7.0(2.0) | 0.25(0.03) | 12.8 |
| 14 | 50 | 30 | 10.5(3.0) | 0.25(0.03) | 9.3 |
| 15 | 50 | 30 | 7.0(2.0) | 1.00(0.12) | 12.0 |
| 16 | 50 | 30 | 10.5(3.0) | 1.00(0.12) | 8.5 |
| 17 | 50 | 30 | 8.8(2.5) | 0.58(0.07) | 10.6 |

TABLE 3-continued

| Sample No. | Ag/Pd powder (wt. %) | Organic vehicle (wt. %) | Pd resinate (wt. %) (Note 1) | Cr resinate (wt. %) (Note 2) | Solvent (wt. %) |
| --- | --- | --- | --- | --- | --- |
| 18 | 50 | 30 | 8.8(2.5) | 1.25(0.15) | 10.0 |
| 19 | 50 | 30 | 12.3(3.5) | 1.00(0.12) | 6.7 |

Note 1: Numerical figures in parentheses indicate amounts of added Pd resinate in parts by weight as metallic Pd, based on 100 parts by weight of Pd component.
Note 2: Numerical figures in parentheses indicate amounts of added Cr resinate in parts by weight as $Cr_2O_3$, based on 100 parts by weight of Ag/Pd powder.

Each paste shown in Table 3 was applied, through screen printing, to a ceramic green sheet formed of dielectric powder comprising barium titanate as a primary component and an organic binder and having a thickness of 20 μm so as to obtain a coating film having a thickness of 2 μm, and the film was brought to dryness. The dry film was subjected to density measurement. A plurality of the obtained films were laminated and pressed so as to obtain a laminate having 11 layers of internal electrodes which was cut and fired in air at 1300° C. to thereby obtain a sintered laminated ceramic capacitor.

The sintered capacitor was cut in a direction normal to an internal electrode plane, and the cross-section was observed to check for structural defects such as delamination or cracks.

The density of the dried films obtained from the pastes and occurrence of structural defects are shown in Table 4.

TABLE 4

| Sample No. | Film density of dried film obtained from the paste (g/cm³) | Occurrence of structural defects (%) |
| --- | --- | --- |
| 13 | 5.5 | 0 |
| 14 | 5.1 | 0 |
| 15 | 5.4 | 0 |
| 16 | 4.8 | 0 |
| 17 | 5.2 | 0 |
| 18 | 5.1 | 1.9 |
| 19 | 4.6 | 3.5 |

As is clear from Tables 3 and 4, in the case of Ag/Pd pastes, like the case of the Pd pastes, incorporation of Pd resinate and Cr resinate into the Pd pastes reduces the density of the dried films obtained from the pastes to thereby successfully allow oxidation-induced expansion of Pd and prevents anomalous growth of metal powder. Thus, structural defects such as delamination can be prevented.

Sudden heat generation from a binder component at low temperature during the degreasing step can be prevented by use of a resinate containing sulfur in the molecule serving as Pd resinate. This also prevents generation of structural defects.

As demonstrated by sample Nos. 13 through 17, Pd resinate is incorporated more preferably in an amount of about 2.0–3.0 parts by weight as metallic Pd, based on 100 parts by weight of Pd (powder), in that structural defects are more effectively prevented. Cr resinate is incorporated more preferably in an amount of 0.03–0.12 parts by weight as $Cr_2O_3$, based on 100 parts per weight of the metal powder, in that structural defects are more effectively prevented.

In the above Examples 1 and 2, the present invention was described by way of example in which the paste is used for forming internal electrodes in a laminated ceramic capacitor.

However, the present invention should not construed as being limited to such embodiments. The paste of the present invention provides the same effects when used for forming internal electrodes in other ceramic elements, such as multilayer circuit boards and LC composite elements.

As described herein, the Pd paste or Ag/Pd paste according to the present invention containing Pd resinate and Cr resinate enables reduction in density of the dry films obtained from the pastes to thereby allow oxidation-induced expansion of Pd when used for producing a laminated ceramic capacitor. Also, it prevents anomalous growth of metal powder. Thus, structural defects such as delamination can be prevented.

Sudden heat generation from a binder component at low temperature during the degreasing step can be prevented by use of a resinate containing sulfur in the molecule serving as Pd resinate. This also contributes to prevention of structural defects from being generated.

While the invention has been particularly shown and described with reference to preferred embodiments thereof, it will be understood by those skilled in the art that the forgoing and other changes in form and details may be made therein without departing from the spirit of the invention.

What is claimed is:

1. A paste for forming an internal electrode in a ceramic element, comprising a Pd or Ag/Pd metal powder, Pd resinate, Cr resinate and an organic vehicle.

2. The paste according to claim 1, wherein the paste contains a Ag/Pd metal powder which is at least one member selected from the group consisting of Ag-Pd alloy powder, Ag and Pd co-precipitate powder and a mixture of Ag and Pd powders.

3. The paste according to claim 2, wherein the Pd resinate contains sulfur.

4. The paste according to claim 3, wherein:

the Pd resinate is about 2.0–3.0 parts by weight calculated as Pd, based on 100 parts by weight of Pd in the metal powder, and the Cr resinate is about 0.03–0.12 parts by weight calculated as $Cr_2O_3$, based on 100 parts by weight of the metal powder.

5. The paste according to claim 4, wherein the Ag/Pd metal powder is Ag-Pd alloy powder.

6. The paste according to claim 4, wherein the Ag/Pd metal powder is Ag and Pd co-precipitate powder.

7. The paste according to claim 4, wherein the Ag/Pd metal powder is a mixture of Ag and Pd powders.

8. The paste according to claim 2, wherein:

the Pd resinate is in an amount of about 2.0–3.0 parts by weight calculated as Pd, based on 100 parts by weight of Pd in the metal powder, and the Cr resinate is in an amount of about 0.03–0.12 parts by weight calculated as $Cr_2O_3$, based on 100 parts by weight of the metal powder.

9. The paste according to claim 1, wherein:

the Pd resinate is in an amount of about 2.0–3.0 parts by weight calculated as Pd, based on 100 parts by weight of Pd in the metal powder, and the Cr resinate is in an amount of about 0.03–0.12 parts by weight calculated as $Cr_2O_3$, based on 100 parts by weight of the metal powder.

10. The paste according to claim 1, wherein the Pd resinate contains sulfur.

11. The paste according to claim 10, wherein:

the Pd resinate is in an amount of about 2.0–3.0 parts by weight calculated as Pd, based on 100 parts by weight of Pd in the metal powder, and the Cr resinate is in an amount of about 0.03–0.12 parts by weight calculated as $Cr_2O_3$, based on 100 parts by weight of the metal powder.

12. The paste according to claim 1, wherein the paste contains Pd powder.

13. The paste according to claim 12, wherein the Pd resinate contains sulfur.

14. The paste according to claim 13, wherein:

the Pd resinate is about 2.0–3.0 parts by weight calculated as Pd, based on 100 parts by weight of Pd in the metal powder, and the Cr resinate is about 0.03–0.12 parts by weight calculated as $Cr_2O_3$, based on 100 parts by weight of the metal powder.

15. The paste according to claim 12, wherein:

the Pd resinate is about 2.0–3.0 parts by weight calculated as Pd, based on 100 parts by weight of Pd in the metal powder, and the Cr resinate is about 0.03–0.12 parts by weight calculated as $Cr_2O_3$, based on 100 parts by weight of the metal powder.

* * * * *